(12) United States Patent
Chiang et al.

(10) Patent No.: US 11,899,255 B2
(45) Date of Patent: Feb. 13, 2024

(54) OPTICAL PRINTED CIRCUIT BOARD AND ITS FABRICATING METHOD

(71) Applicant: City University of Hong Kong, Kowloon (HK)

(72) Inventors: Kin Seng Chiang, Kowloon (HK); Wei Jin, New Territories (HK); Kar Pong Lor, Ap Lei Chau (HK); Hau Ping Chan, New Territories (HK)

(73) Assignee: City University of Hong Kong, Kowloon (HK)

( * ) Notice: Subject to any disclaimer, the term of this patent is extended or adjusted under 35 U.S.C. 154(b) by 62 days.

(21) Appl. No.: 17/843,102

(22) Filed: Jun. 17, 2022

(65) Prior Publication Data
US 2023/0408779 A1    Dec. 21, 2023

(51) Int. Cl.
G02B 6/42    (2006.01)
G02B 6/38    (2006.01)

(52) U.S. Cl.
CPC ......... G02B 6/4292 (2013.01); G02B 6/3897 (2013.01); G02B 6/4231 (2013.01); *G02B 6/3829* (2013.01); *G02B 6/4243* (2013.01)

(58) Field of Classification Search
None
See application file for complete search history.

(56) References Cited

U.S. PATENT DOCUMENTS

| | | | | |
|---|---|---|---|---|
| 5,539,848 A | * | 7/1996 | Galloway | G02B 6/4283 385/89 |
| 8,285,087 B2 | * | 10/2012 | Kim | G02B 6/4214 385/129 |
| 8,306,374 B2 | | 11/2012 | Pitwon et al. | |
| 8,488,920 B2 | * | 7/2013 | Pitwon | H05K 1/0274 359/341.3 |

(Continued)

FOREIGN PATENT DOCUMENTS

| | | |
|---|---|---|
| CN | 104570210 | 4/2015 |
| CN | 103529514 | 11/2015 |

(Continued)

OTHER PUBLICATIONS

Optical Interconnects: Out of the Box Forever? Dawei Huang, Member, IEEE, Theresa Sze, Member, IEEE, Anders Landin, Rick Lytel, Member, IEEE, and Howard L. Davidson, Senior Member, IEEE IEEE Journal of Selected Topics in Quantum Electronics, vol. 9, No. 2, Mar./Apr. 2003.

(Continued)

*Primary Examiner* — Jerry Rahll
(74) *Attorney, Agent, or Firm* — Renner, Kenner, Greive, Bobak, Taylor & Weber (57) ABSTRACT

There is provided a method for fabricating an optical printed circuit board. The method includes preparing a first printed circuit board portion with an array of optical fibers attached thereon, assembling an optical fiber connector with the first printed circuit board portion such that the optical fiber connector is arranged at ends of the array of optical fibers, (Continued)

and attaching one or more second printed circuit board portions to the first printed circuit board portion to form an optical printed circuit board with the optical fiber connector embedded therein. The optical fiber connector includes an engagement mechanism arranged for engagement with an external optical device.

22 Claims, 7 Drawing Sheets

(56) References Cited

U.S. PATENT DOCUMENTS

| | | | |
|---|---|---|---|
| 8,867,871 | B2 | 10/2014 | Choi |
| 9,052,480 | B2 | 6/2015 | Yabre et al. |
| 2010/0027941 | A1* | 2/2010 | Stewart .............. H01R 13/6315 385/62 |
| 2012/0114280 | A1 | 5/2012 | Pitown |
| 2013/0286676 | A1 | 10/2013 | Kim et al. |
| 2013/0306846 | A1* | 11/2013 | Wu ...................... G02B 6/4292 250/227.11 |
| 2015/0003778 | A1 | 1/2015 | Ha |
| 2023/0026337 | A1* | 1/2023 | Briant .................. G02B 6/4268 |

FOREIGN PATENT DOCUMENTS

| | | |
|---|---|---|
| CN | 103630986 | 4/2016 |
| CN | 103926647 | 3/2017 |
| EP | 0745873 | 4/1996 |
| WO | 2015157980 | 10/2015 |

OTHER PUBLICATIONS

Low-Cost, Precision, Self-Alignment Technique for Coupling Laser and Photodiode Arrays to Polymer Waveguide Arrays on Multilayer PCBs Ioannis Papakonstantinou, Student Member, IEEE, David R. Selviah, Member, IEEE, Richard C. A. Pitwon, and Dave Milward IEEE Transactions on Advanced Packaging, vol. 31, No. 3, Aug. 2008.

Pluggable Electro-Optical Circuit Board Interconnect Based on Embedded Graded-Index Planar Glass Waveguides Richard Charles Alexander Pitwon, Member, IEEE, Lars Brusberg, Henning Schroder, Simon Whalley, Kai Wang, Member, IEEE, Allen Miller, Paul Stevens, Alex Worrall, Alessandro Messina, and Andrew Cole Journal of Lightwave Technology, vol. 33, No. 4, Feb. 15, 2015.

High-Precision, Self-Aligned, Optical Fiber Connectivity Solution for Single-Mode Waveguides Embedded in Optical PCBs Roger Krahenbuhl, Member, IEEE, Tobias Lamprecht, Member, IEEE, Eugen Zgraggen, Student Member, IEEE, Felix Betschon, Member, IEEE, and Adrian Peterhans Journal of Lightwave Technology, vol. 33, No. 4, Feb. 15, 2015.

Flexible Polymer Waveguides With Integrated Mirrors Fabricated by Soft Lithography for Optical Interconnection Guomin Jiang, Sarfaraz Baig, and Michael R. Wang Journal of Lightwave Technology, vol. 31, No. 11, Jun. 1, 2013.

Display glass for low-loss and high-density optical interconnects in electro-optical circuit boards with eight optical layers Lars Brusberg, 1,* Simon Whalley,2 Christian Herbst,3 and Henning Schröder1 1Fraunhofer Institute for Reliability and Microintegration,Gustav-Meyer-Allee 25, 13086 Berlin, Germany 2ILFA Feinstleitertechnik GmbH, Lohweg 3, 30559 Hannover, Germany 3Technical University of Berlin, Gustav-Meyer-Allee 25, 13086 Berlin, Germany *lars.brusberg@izm.fraunhofer.de.

* cited by examiner

OPTICAL PRINTED CIRCUIT BOARD AND ITS FABRICATING METHOD

TECHNICAL FIELD

The present invention relates to an optical printed circuit board (OPCB) and a method for fabricating the same. In particular, the present invention provides an optical printed circuit board (OPCB) including an optical fiber connector to connect with an external optical device and a method for fabricating the same.

BACKGROUND

A printed circuit board (PCB) is a dielectric board with copper traces to provide electrical connection and mechanical support for electronic components in electrical appliances. Nowadays, the demand for high-speed data transmission (>10 Gb/s) on PCBs for applications such as ultra-high-speed computing and communication is growing rapidly. At a data rate higher than several Gb/s, copper traces on PCBs suffer from problems, such as signal loss, electromagnetic interference, crosstalk, etc. As one of the solutions to this problem, embedding optical fibers or waveguides into PCBs were introduced. There are existing techniques for manufacturing such optical PCBs (OPCBs).

However, there has been a need to develop an improved method for fabricating the OPCBs for a low-cost manufacturing process and also can be compatible with the existing PCB industry.

SUMMARY OF THE INVENTION

According to embodiments of the present invention, there is provided a method for fabricating an optical printed circuit board (OPCB), including preparing a first printed circuit board portion with an array of optical fibers attached thereon, assembling an optical fiber connector with the first printed circuit board portion such that the optical fiber connector is arranged at ends of the array of optical fibers, and attaching one or more second printed circuit board portions to the first printed circuit board portion to form an optical printed circuit board with the optical fiber connector embedded therein. The optical fiber connector includes an engagement mechanism arranged for engagement with an external optical device.

In some embodiments, preparing the first printed circuit board portion may include forming a recess in the first printed circuit board portion, and attaching the array of optical fibers onto the first printed circuit board portion such that the ends of the array of optical fibers are arranged in the recess.

In some embodiments, assembling the optical fiber connector may include arranging a lower glass fixture to the first printed circuit board portion, the lower glass fixture including one or more grooves formed on an upper surface of the lower glass fixture, and the array of optical fibers of the first printed circuit board portion being placed in the one or more grooves, and attaching an upper glass fixture onto the lower glass fixture such that the array of optical fibers are placed between the lower glass fixture and the upper glass fixture.

In some embodiments, the engagement mechanism may include a guide member arranged to be received in a corresponding socket on the external optical device, and the guide member may define a plug.

In some embodiments, the method may further include arranging the guide member on the lower glass fixture prior to attaching the upper glass fixture onto the lower glass fixture. The guide member may include guide pins for the plug. The one or more grooves may further include larger size of grooves for receiving the guide pins.

In some embodiments, the guide member may have a cylindrical body, and the guide member may be metallic.

In some embodiments, the cylindrical body may extend in and project from the optical printed circuit board.

In some embodiments, the engagement mechanism may include a guide member defining a socket for receiving a corresponding plug on the external optical device.

In some embodiments, the guide member may have a tubular body that defines the socket, and the guide member may be metallic.

In some embodiments, the one or more grooves may be V-shaped.

In some embodiments, the engagement mechanism may include a guide member, and the guide member may extend in parallel with a plane surface of the first printed circuit board portion.

In some embodiments, attaching one or more second printed circuit board portions to the first printed circuit board portion may include laminating the first printed circuit board portion and the one or more second printed circuit board portions.

According to another aspect of the invention, there is provided an optical printed circuit board (OPCB), including an electrical conductor arranged for conducting an electrical signal, an array of optical fibers arranged for transmitting an optical signal, and an optical fiber connector embedded in the optical printed circuit board and arranged at ends of the array of optical fibers. The optical fiber connector includes an engagement mechanism arranged for engagement with an external optical device to optically couple the external optical device with the array of the optical fibers. The engagement mechanism may be at least in part exposed to engage with the external optical device.

In some embodiments, the optical fiber connector may include a lower glass fixture including one or more grooves formed on an upper surface of the lower glass fixture, and an upper glass fixture attached onto the lower glass fixture. The ends of the array of fibers may be placed in the one or more grooves between the lower glass fixture and the upper glass fixture.

In some embodiments, the engagement mechanism may include a guide member arranged to be received in a corresponding socket on the external optical device, and the guide member may have a cylindrical body defining a plug and be metallic.

In some embodiments, the guide member may include guide pins, and the lower glass fixture may further include larger size of grooves formed on an upper surface of the lower glass fixture for receiving the guide pins.

In some embodiments, wherein the one or more grooves and the larger size of grooves may be V-shaped.

In some embodiments, the engagement mechanism may include a guide member defining a socket for receiving a corresponding plug on the external optical device, and the guide member may have a tubular body that defines the socket and be metallic.

In some embodiments, the engagement mechanism may include a guide member, and the guide member may extend in parallel with a plane surface of the optical printed circuit board.

In some embodiments, the cylindrical body may extend in and project from the optical printed circuit board.

In some embodiments, the tubular body may extend in the optical printed circuit board.

In some embodiments, the optical fiber connector may be a built-in component formed in integral with the optical printed circuit board.

Other features and aspects of the invention will become apparent by consideration of the following detailed description, drawings and claims.

Before any independent constructions of the invention are explained in detail, it is to be understood that the invention is not limited in its application to the details of construction and the arrangement of components set forth in the following description or illustrated in the following drawings. The invention is capable of other independent constructions and of being practiced or of being carried out in various ways. Also, it is to be understood that the phraseology and terminology used herein is for the purpose of description and should not be regarded as limiting.

BRIEF DESCRIPTION OF DRAWINGS

These and other features of the invention will become more apparent from the following description, by way of example only, with reference to the accompanying drawings, in which.

Before any embodiments of the invention are explained in detail, it is to be understood that the invention is not limited in its application to the details of embodiment and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION OF PREFERRED EMBODIMENTS

Hereinafter, embodiments of the present disclosure will be described in detail with reference to the drawings.

According to embodiments of the present invention, there are provided optical printed circuit boards (OPCBs) and a fabrication process for mass production of the OPCBs. According to embodiments, the OPCBs are fiber-embedded with built-in connector plugs (or sockets) at optical terminals.

The OPCBs can provide optical interconnect in PCBs for high-speed data transmission and thus enhance the functionality of conventional PCBs. In the OPCB, electric power and low-speed data or control signals are carried by copper traces, while high-speed data signals are carried by embedded optical fibers.

Figure 1:
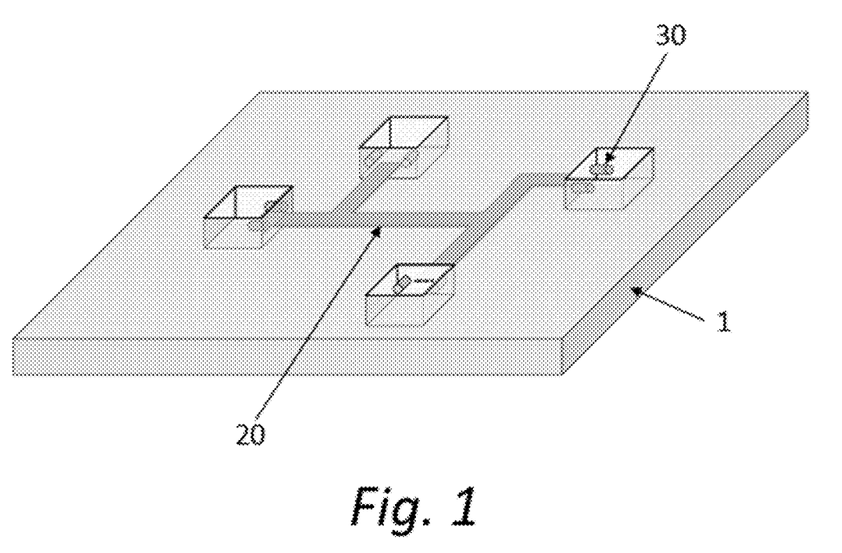
FIG. 1 is a schematic diagram of an optical printed circuit board (OPCB) according to an embodiment of the present invention.

FIG. 1 shows a schematic diagram of an OPCB according to an embodiment of the present invention, where built-in guide-pins are formed at optical terminals of embedded fiber circuits. In a preferred embodiment, an OPCB 1 includes an embedded array of optical fibers 20. The embedded fibers 20 shown in FIG. 1 need not be straight. The embedded fibers 20 may have other structures, such as bends and/or junctions. The array of optical fibers 20 is arranged for transmitting an optical signal between external optical devices. The OPCB 1 may include one or more electrical conductors (not shown) arranged for conducting an electrical signal. The OPCB 1 can be applied to chip-to-chip optical interconnect. The OPCB 1 includes one or more optical fiber connectors 30 embedded therein. The optical fiber connector 30 can be arranged at ends of the array of optical fibers 20. The optical fiber connector 30 includes an engagement mechanism arranged for engagement with an external optical device (not shown) to optically couple the external optical device with the array of the optical fibers 20. The engagement mechanism is, at least in part, exposed at a recess formed in the OPCB 1 to make connection with the external optical device. In FIG. 1, only a part of the optical fiber connector 30 (in particular, a part of the engagement mechanism, i.e., guide pins) is shown while the other parts of the optical fiber connector 30 are embedded in the OPCB 1. The optical fiber connector 30 will be described more in detail later.

Exemplary embodiments of a fabrication process for the OPCB 1 are described hereinafter with reference to FIGS. 2 to 6. The embodiments of the fabrication process include lamination of optical fiber circuits together with the optical fiber connectors.

Figure 2A:
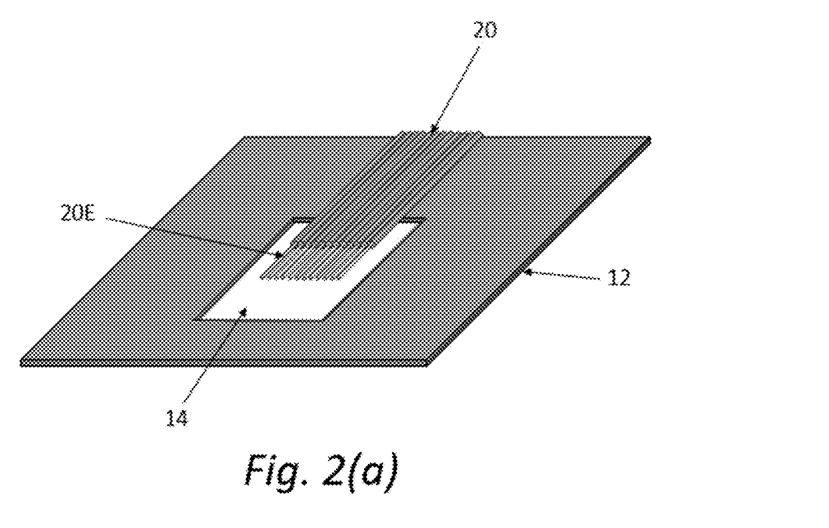
FIG. 2(a) is a schematic diagram of a printed circuit board portion with an array of optical fibers formed thereon according to an embodiment of the present invention.
Figure 2B:
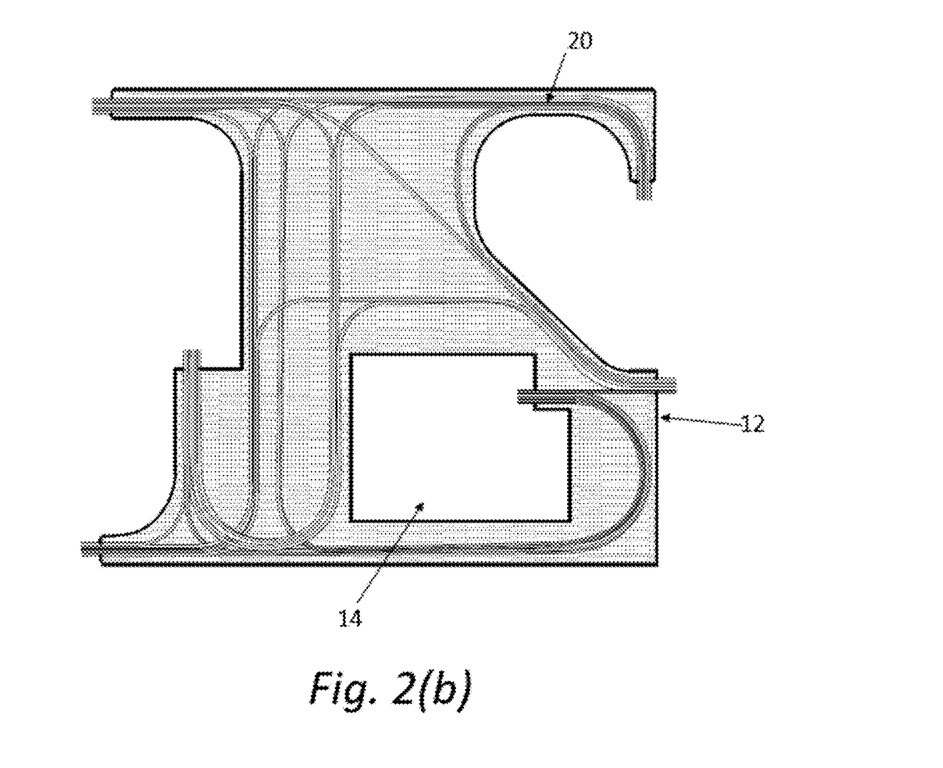
FIG. 2(b) is a plan view of a printed circuit board portion with an array of optical fibers formed thereon according to an embodiment of the present invention.

With reference to FIG. 2(a) and FIG. 2(b), a printed circuit board portion 12 is provided. The printed circuit board portion 12 may include a flexible substrate. The printed circuit board portion 12 may be a layer or a part of the multiple layers constituting the OPCB 1. One or more recesses 14 are formed in the printed circuit board portion 12. An array of optical fibers 20 is attached on the printed circuit board portion 12 with UV epoxy, for example. The fiber array routing can be straight or curved to form a circuit as shown in FIG. 2(b). Ends of the array of optical fibers 20E are well cleaved and parts of plastic jackets are stripped off. Those end parts 20E of the array of optical fibers 20 are provided and arranged in the recess 14.

Figure 3A:
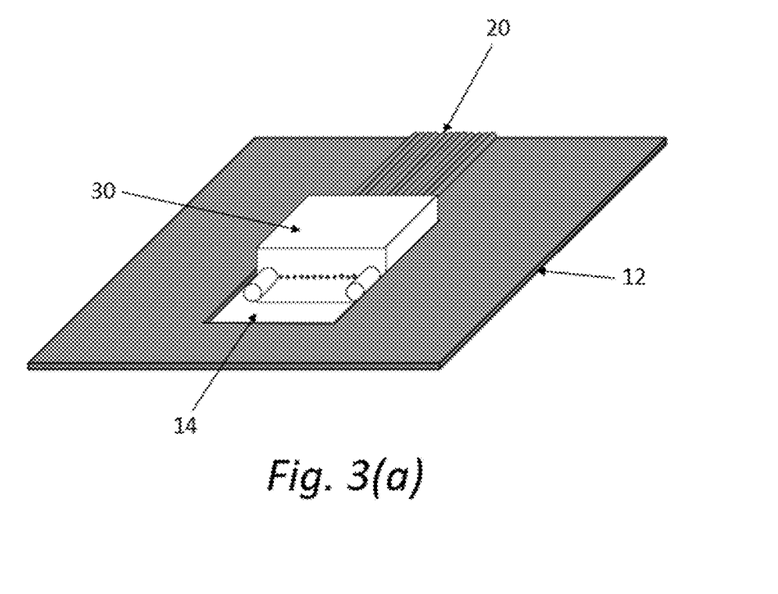
FIG. 3(a) is a schematic diagram of a printed circuit board with an optical fiber connector assembled according to an embodiment of the present invention.
Figure 3B:
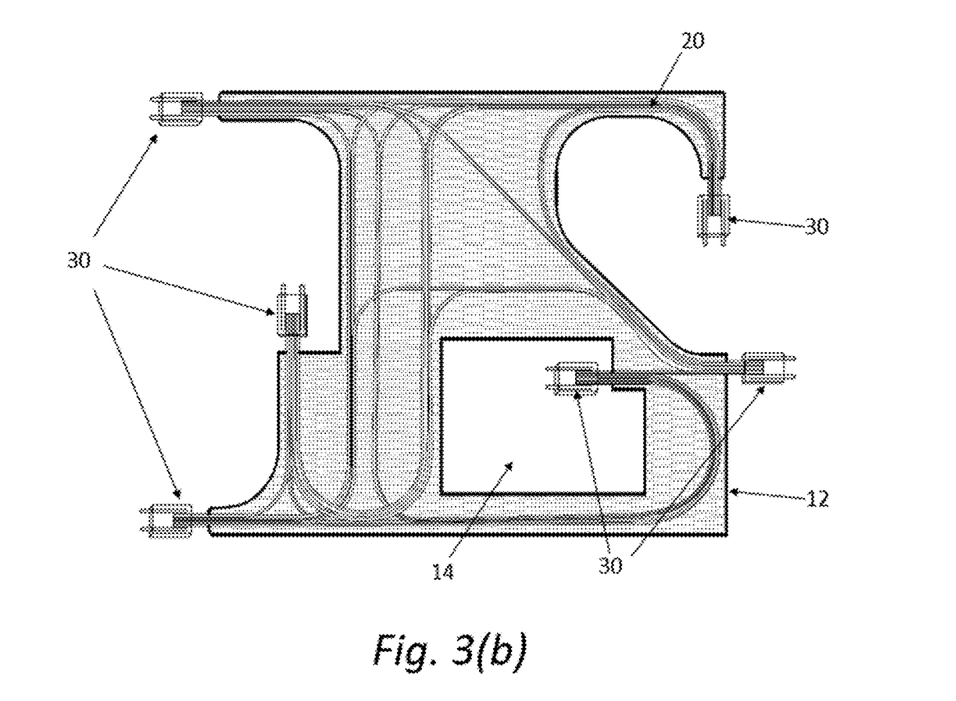
FIG. 3(b) is a plan view of a printed circuit board with an optical fiber connector assembled according to an embodiment of the present invention.
Figure 4A:
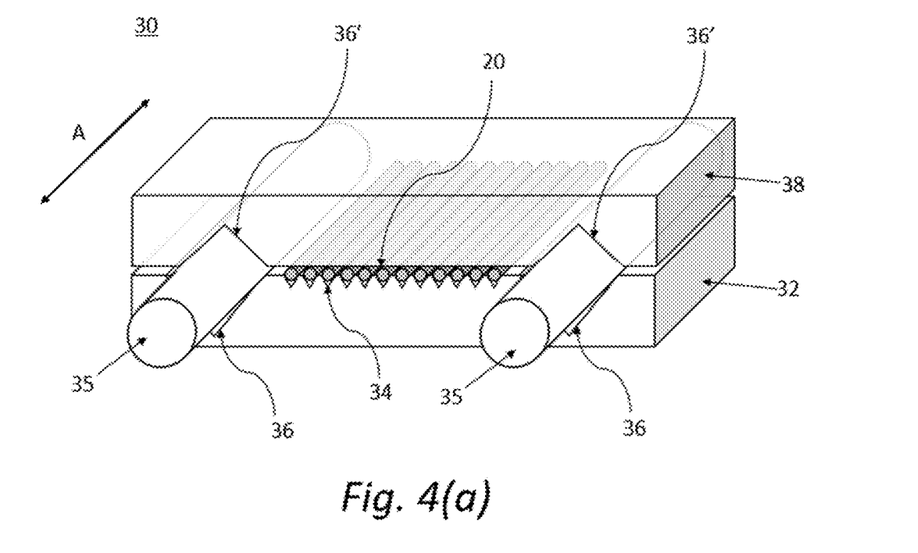
FIG. 4(a) is an enlarged view of the optical fiber connector assembled with the printed circuit board shown in FIG. 3(a)

With reference to FIG. 3(a), an optical fiber connector 30 is assembled at the ends of the array of the fibers 20E. FIG. 4(a) illustrates an enlarged view of the assembled optical fiber connector 30 shown in FIG. 3(a). First, a lower glass fixture 32 can be arranged to the printed circuit board portion 12. As shown in FIG. 3(a) and FIG. 4(a), the lower glass fixture 32 can be arranged below the printed circuit board portion 12 so that the array of the fibers 20 attached on the printed circuit board portion 12 can be placed on the lower glass fixture 32. In particular, the ends of the fibers 20E are arranged on the lower glass fixture 32. In a preferred embodiment, two larger sized V-grooves 36 and a number of smaller V-grooves 34 in between are formed on an upper surface of the lower glass fixture 32. The number of smaller sized grooves 34 are arranged for the array of the fibers 20. In other words, when assembling the lower glass fixture 32 with the printed circuit board portion 12 having the array of fibers 20, the array of fibers 20 are placed into the smaller sized grooves 34 formed on the lower glass fixture 32. The ends of the fibers 20E are aligned with an edge of the lower glass fixture 32 as shown in FIG. 4(a). The two larger sized grooves 36 are for an engagement mechanism 35 of the optical fiber connector 30. In an embodiment, the engagement mechanism 35 may include a guide member which is in the form of a plug. In this case, the guide member 35 can include two guide pins defining the plug, and are arranged to be received in a corresponding socket on the external optical device. Each of the guide pins may include a cylindrical body to form the plug. The cylindrical body can be metallic. In another embodiment, the engagement mechanism 35 may include a guide member which is in the form of a socket. The guide member may include a tubular body defining the socket for receiving a corresponding plug on the external optical device. The tubular body can be metallic. FIG. 3(b) shows an exemplary fiber circuit board (i.e., the printed circuit board portion with the array of fibers attached thereon) which incorporates a number of optical fiber connectors 30.

Next, with reference to FIG. 4(a) again, an upper glass fixture 38 can be attached onto the lower glass fixture 32 so that the ends of the array of fibers 20E are placed between the lower glass fixture 32 and the upper glass fixture 38. In a preferred embodiment, two larger sized V-grooves 36' are formed on a bottom surface of the upper glass fixture 38. In another embodiment, a number of smaller sized grooves may be formed on the bottom surface of the upper glass fixture 38 between the two larger sized grooves 36' similarly to the lower glass fixture 32 for fitting the array of the fibers 20.

Figure 4B:
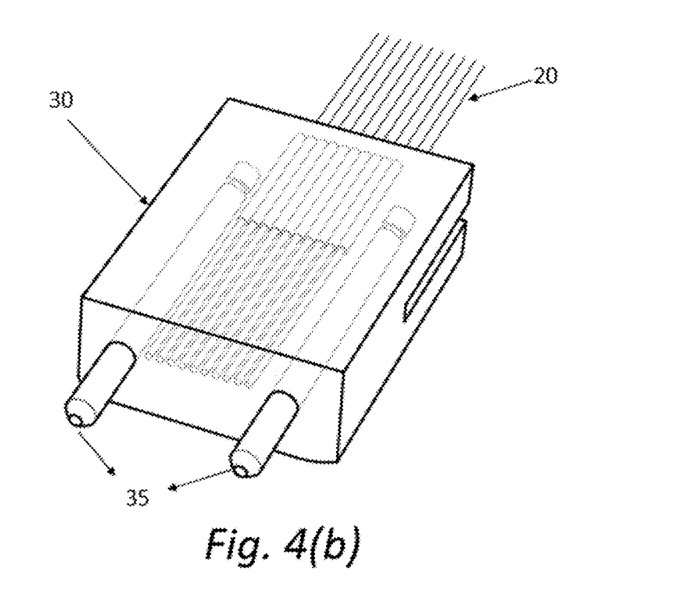
FIG. 4(b) is an enlarged view of the optical fiber connector assembled with the printed circuit board shown in FIG. 3(b)

The guide member 35 (for example, two guide pins in FIG. 4(a)) is placed into the two large V-grooves 36 of the lower glass fixture 32 with several millimeters of the guide member 35 protruded from the upper surface of the lower glass fixture 32. Then, the upper glass fixture 38 is glued on the fiber-laid lower fixture 32 with UV epoxy. The size and the position of the V-grooves are carefully designed for housing the optical fibers 20 and the two large guide-pins 35, so that the fabricated connector 30 is compatible with commercial standard mechanical transfer (MT)-compliant sockets and can serve as an optical terminal (input/output) of the OPCB 1. FIG. 4(b) shows an enlarged view of the assembled optical fiber connector 30 with the end parts of the array of fibers 20E.

Figure 5:
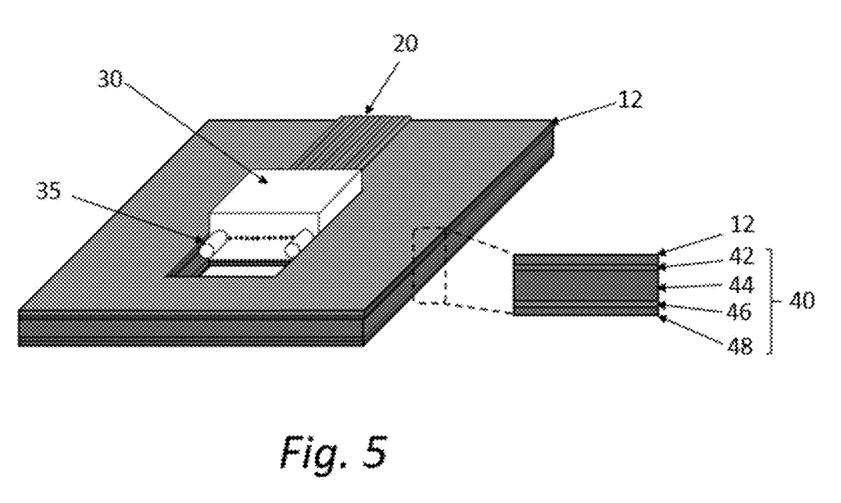
FIG. 5 is a schematic diagram of a printed circuit board with an optical fiber connector formed on a first multilayer according to an embodiment of the present invention.

With reference to FIG. 5, the printed circuit board portion 12 with the array of optical fibers 20 and the assembled optical fiber connector 30 can be placed on a multilayer structure 40. The multilayer structure 40 may consist of a Prepreg 42, an inner FR4 44, a Prepreg 46, and an outer FR4 48, from a top layer to a bottom layer, as shown in FIG. 5. The Prepreg is known as a composite material made from "pre-impregnated" fibers and a partially cured polymer matrix, such as epoxy or phenolic resin, or even thermoplastic mixed with liquid rubbers or resins. The FR4 is known as a composite material composed of woven fiberglass cloth with an epoxy resin binder that is flame resistant.

Figure 6A:
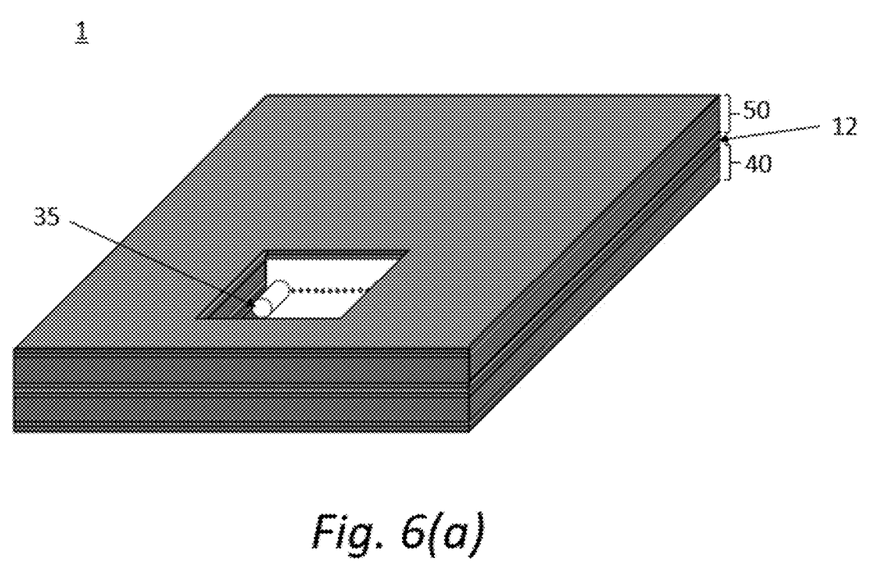
FIG. 6(a) is a schematic diagram of a fabricated OPCB according to an embodiment of the present invention.
Figure 6B:
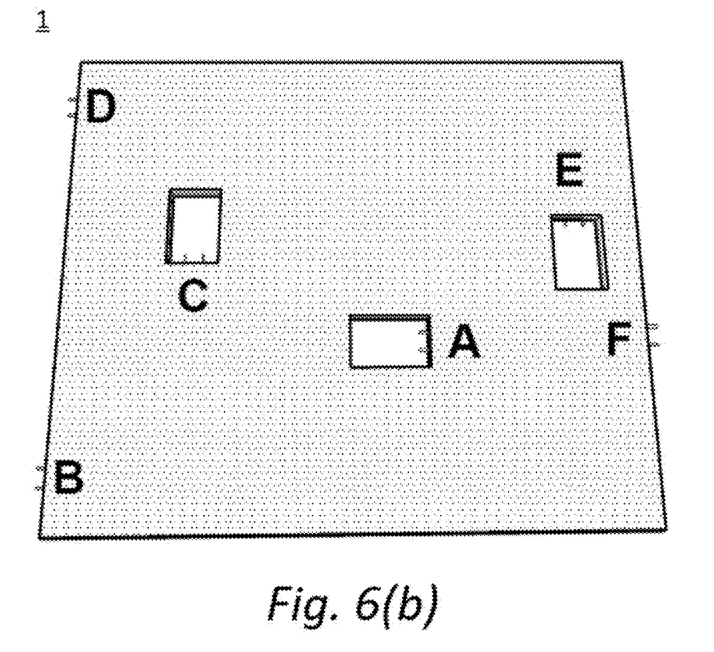
FIG. 6(b) is a plan view of a fabricated OPCB according to an embodiment of the present invention.

With reference to FIG. 6(a), the printed circuit board portion 12 with the array of optical fibers 20 and the assembled optical fiber connector 30 can be covered with another multilayer structure 50 including a set of FR4s and Prepregs similar to the multilayer structure 40. Finally, the whole structure is laminated by a standard pressing procedure to produce the OPCB 1. Here, the printed circuit board portion 12 can be defined as a first printed circuit board portion and the multilayer structures 40 and 50 can be defined as one or more second printed circuit board portions to form the OPCB 1. As shown in FIG. 6(a), the optical fiber connector 30 is embedded in the OPCB 1 with only a part of the connector 30 (for example, at least a part of the engagement mechanism exposed. At least a top part and a bottom part of the optical fiber connector 30 can be covered by a layer or layers of the multiple structures 40, 50. FIG. 6(b) shows the fabricated OPCB 1 incorporating a number of built-in optical fiber connectors 30A, 30B, 30D, 30E and 30F.

With reference back to FIG. 1 and FIG. 4(a), the embodiments of the present invention provide the OPCB 1 containing the embedded fiber array 20 together with built-in optical fiber connectors 30 that include standard guide pins 35 at the fiber terminals. The guide pins 35 (also referred as the guide member) may have a cylindrical body that extends in a direction A as shown in FIG. 4(a). That is, the guide member 35 extends in parallel with a plane surface of the printed circuit board portion 12. In this embodiment, the guide pins 35 define a plug and are made of metal. The guide member extends in and projects from the OPCB 20 in the recess 14 to engage with the external optical device. In another embodiment, the guide member 35 may be provided as a socket in which the guide member includes a tubular body defining the socket. The tubular body may extend in the direction A which is parallel with a plane surface of the printed circuit board portion 12. The tubular body may be made of metal.

Figure 7:
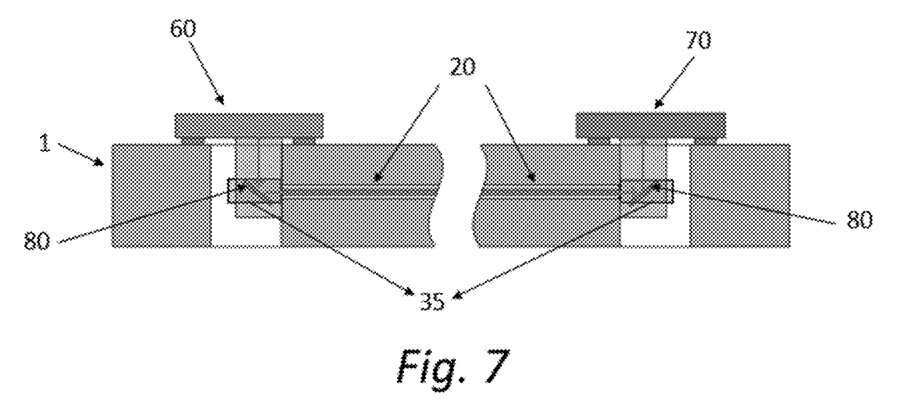
FIG. 7 is a sectional view of an OPCB with an external optical device coupled thereto according to an embodiment of the present invention.

FIG. 7 shows an exemplary OPCB assembly in which the optical fiber connector 30 of the OPCB 1 couples the array of optical fibers 20 with external optical devices 60, 70. The array of optical fibers 20 is fully embedded in the OPCB 1. The end parts of the fibers 20E are assembled with the optical fiber connectors 30 as described earlier. The optical fiber connectors (in particular, the guide pins 35) are plugged into a socket of the external optical device such as a vertical-cavity surface-emitting laser (VCSEL) 60 or a photodetector 70. For example, the light is coupled into the embedded array of fibers 20 from the VC SEL 60 and coupled out from the embedded array of fibers to the photodetector 70 using two optical fiber connectors (formed with 90° turning mirrors 80) incorporated in the OPCB 1.

The OPCB manufacturing process according to embodiments of the present invention is cost-effective and compatible with the existing PCB manufacturing technology. The process can produce an OPCB that contains not only fully embedded optical fiber circuits, but also robust built-in optical fiber connectors to facilitate connection with external optical components terminated with standard connectors. The OPCB according to the embodiments of the present invention can greatly lower the connection cost and provide an effective solution for chip-to-chip optical interconnection required for high-speed data transmission applications. The OPCB fabrication process introduced here is compatible with the existing PCB manufacturing process. In addition, the OPCB incorporates built-in connectors (in the form of guide-holes/pins) at the embedded fiber terminals. The resultant OPCB s allow direct coupling to existing optical components (such as transceivers) that incorporate standard connectors. The OPCB fabrication method according to the embodiments allows a low-cost OPCB manufacturing process for mass production of OPCB s.

It should be understood that the above only illustrates and describes examples whereby the present invention may be carried out, and that modifications and/or alterations may be made thereto without departing from the spirit of the invention.

It should also be understood that certain features of the invention, which are, for clarity, described in the context of separate embodiments, may also be provided in combination in a single embodiment. Conversely, various features of the invention which are, for brevity, described in the context of a single embodiment, may also be provided or separately or in any suitable sub-combination.

The invention claimed is:

1. A method for fabricating an optical printed circuit board (OPCB), comprising:
   preparing a first printed circuit board portion with an array of optical fibers attached thereon;
   assembling an optical fiber connector with the first printed circuit board portion such that the optical fiber connector is arranged at ends of the array of optical fibers; and
   attaching one or more second printed circuit board portions to the first printed circuit board portion to form an optical printed circuit board with the optical fiber connector embedded therein,
   wherein the optical fiber connector comprises an engagement mechanism arranged for engagement with an external optical device.

2. The method of claim 1, wherein preparing the first printed circuit board portion comprises,
   forming a recess in the first printed circuit board portion, and
   attaching the array of optical fibers onto the first printed circuit board portion such that the ends of the array of optical fibers are arranged in the recess.

3. The method of claim 1, wherein assembling the optical fiber connector comprises,
   arranging a lower glass fixture to the first printed circuit board portion, the lower glass fixture including one or more grooves formed on an upper surface of the lower glass fixture, wherein the array of optical fibers of the first printed circuit board portion are placed in the one or more grooves; and
   attaching an upper glass fixture onto the lower glass fixture such that the array of optical fibers are placed between the lower glass fixture and the upper glass fixture.

4. The method of claim 3, wherein the engagement mechanism comprises a guide member arranged to be received in a corresponding socket on the external optical device, and the guide member defines a plug.

5. The method of claim 4, further comprising arranging the guide member on the lower glass fixture prior to attaching the upper glass fixture onto the lower glass fixture, wherein the guide member comprises guide pins for the plug and the one or more grooves further include larger size of grooves for receiving the guide pins.

6. The method of claim 4, wherein the guide member has a cylindrical body, and the guide member is metallic.

7. The method of claim 6, wherein the cylindrical body extends in and projects from the optical printed circuit board.

8. The method of claim 3, wherein the engagement mechanism comprises a guide member defining a socket for receiving a corresponding plug on the external optical device.

9. The method of claim 8, wherein the guide member has a tubular body that defines the socket, and the guide member is metallic.

10. The method of claim 3, wherein the one or more grooves are V-shaped.

11. The method of claim 1, wherein the engagement mechanism comprises a guide member, and the guide member extends in parallel with a plane surface of the first printed circuit board portion.

12. The method of claim 1, wherein attaching one or more second printed circuit board portions to the first printed circuit board portion comprises laminating the first printed circuit board portion and the one or more second printed circuit board portions.

13. An optical printed circuit board (OPCB), comprising:
    an electrical conductor arranged for conducting an electrical signal;
    an array of optical fibers arranged for transmitting an optical signal; and
    an optical fiber connector embedded in the optical printed circuit board and arranged at ends of the array of optical fibers, the optical fiber connector comprising an engagement mechanism arranged for engagement with an external optical device to optically couple the external optical device with the array of the optical fibers,
    wherein the engagement mechanism is at least in part exposed to engage with the external optical device.

14. The optical printed circuit board of claim 13, wherein the optical fiber connector comprises,
    a lower glass fixture including one or more grooves formed on an upper surface of the lower glass fixture, and
    an upper glass fixture attached onto the lower glass fixture,
    wherein the ends of the array of fibers are placed in the one or more grooves between the lower glass fixture and the upper glass fixture.

15. The optical printed circuit board of claim 14, wherein the optical fiber connector is a built-in component formed in integral with the optical printed circuit board.

16. The optical printed circuit board of claim 14, wherein the engagement mechanism comprises a guide member, and the guide member extends in parallel with a plane surface of the optical printed circuit board.

17. The optical printed circuit board of claim 14, wherein the engagement mechanism comprises a guide member defining a socket for receiving a corresponding plug on the external optical device, and the guide member has a tubular body that defines the socket and is metallic.

18. The optical printed circuit board of claim 17, wherein the tubular body extends in the optical printed circuit board.

19. The optical printed circuit board of claim 13, wherein the engagement mechanism comprises a guide member arranged to be received in a corresponding socket on the external optical device, and the guide member has a cylindrical body defining a plug and is metallic.

20. The optical printed circuit board of claim 19, wherein the cylindrical body extends in and projects from the optical printed circuit board.

21. The optical printed circuit board of claim 19, wherein the guide member comprises guide pins, and the lower glass fixture further includes larger size of grooves formed on an upper surface of the lower glass fixture for receiving the guide pins.

22. The optical printed circuit board of claim 21, wherein the one or more grooves and the larger size of grooves are V-shaped.

* * * * *